March 18, 1952     L. H. PETER ET AL     2,589,569
OPTICAL SYSTEM FOR USE IN LIGHT SIGNALS, INDICATORS, AND THE LIKE
Filed July 2, 1949
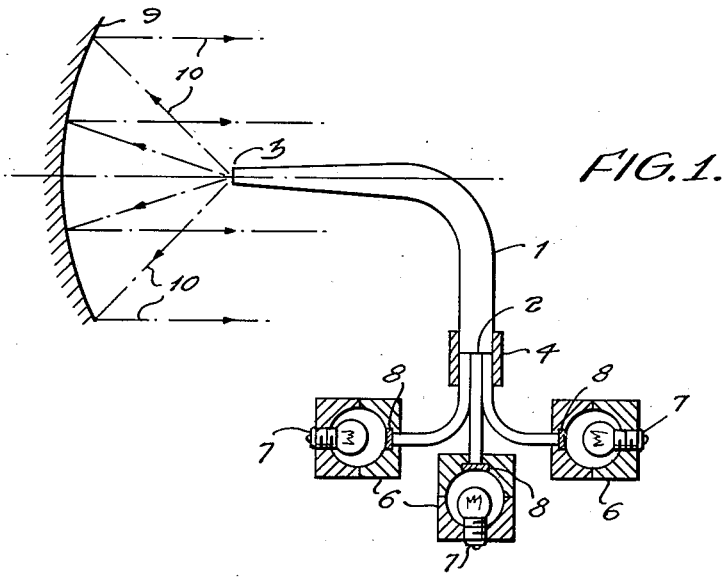
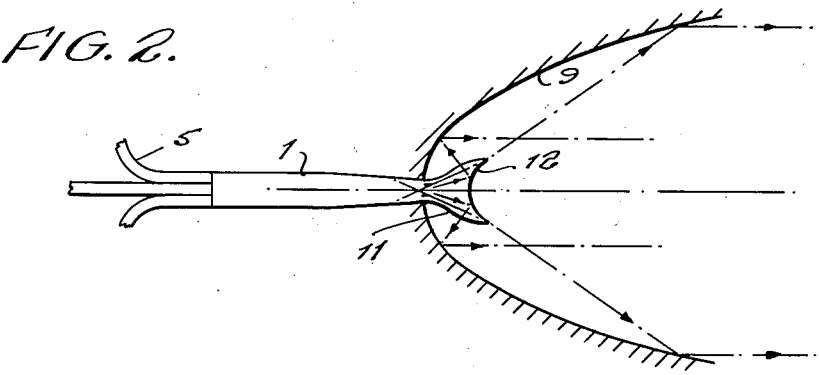
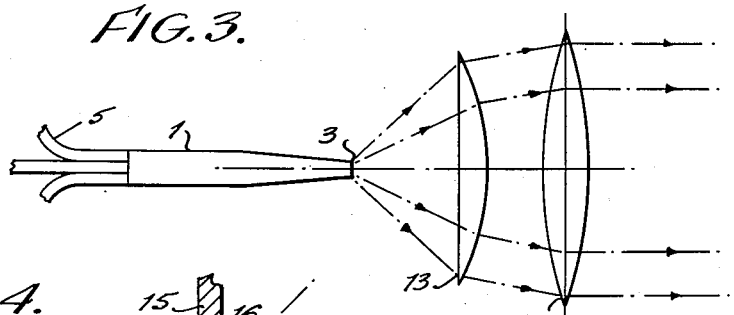
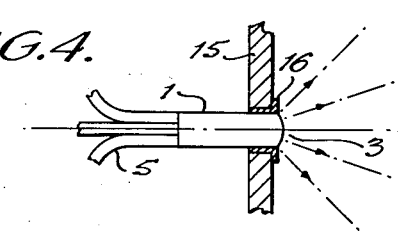

Patented Mar. 18, 1952

2,589,569

UNITED STATES PATENT OFFICE 2,589,569

OPTICAL SYSTEM FOR USE IN LIGHT SIGNALS, INDICATORS, AND THE LIKE

Leslie Hurst Peter, Edward Alfred Sheppard, and Sydney Arthur Stevens, London, England, assignors to Westinghouse Brake and Signal Company Limited, London, England Application July 2, 1949, Serial No. 102,782
In Great Britain August 4, 1948

6 Claims. (Cl. 177—329)

This invention relates to optical systems for use in light signals, indicators and the like and has for its object to provide an improved system of this character.

Optical systems constructed in accordance with the invention are particularly applicable to light signals and indicators which are required to display two or more aspects or indications in accordance with varying conditions controlling the operation of the signals or indicators.

One example of a light signal to which an optical system according to the invention may be applied is the well known light signal used to control railway or road traffic, which signal is adapted to display two or more aspects, each of a different colour. The optical system employed with such signals usually comprises a lamp provided with a specially concentrated filament, which may be backed by a reflector, and a lens system of one or more lenses, the system being usually designed to give a relatively concentrated light beam. In order to impart colour to the light beam a lens of the system may itself be coloured the desired hue, in which case a separate optical system has to be provided for each aspect to be displayed, or a colour filter may be disposed in the beam at some convenient point. In the latter case one optical system only need be employed, filters of different colour being interposed in the beam at different times by a suitable mechanism.

It is an object of the invention to provide a single optical system for such a signal which is capable of causing the display of one or other of two or more different aspects without the employment of mechanism to move filters into and out of the light beam.

The aspects displayed by such signals sometimes have to be indicated on a control panel or diagram situated at a control point. Hitherto this has entailed the provision of two or more lamp units, each with its own coloured cap, mounted on the panel or diagram. Such an arrangement has the disadvantage that it is difficult to provide lamp units small enough to be mounted close enough together realistically to simulate the signal they are intended to represent. It is a further object of the invention to provide an optical system whereby the different aspects displayed by a signal may be indicated at one single point upon the panel or diagram.

According to the invention, an optical system is provided comprising two or more sources of light and a light guide so arranged that light rays from the sources of light are transmitted by internal reflection within the light guide and emerge from the exit end of the light guide.

By the term "light guide" used herein is meant a body of transparent material through which light may be transmitted from one end to the other by internal reflection.

The invention is illustrated in somewhat diagrammatic form, by way of example, in the accompanying drawings, of which, Figure 1 shows one form of optical system embodying the invention, as may be employed in a light signal using a concave mirror;

Figure 2 shows a modification of the system of Figure 1;

Figure 3 shows the invention as applied to a light signal comprising a lens system; and Figure 4 shows the invention as applied to a panel diagram.

Referring first to Figure 1, a light guide comprises a rod or bar 1 of transparent material, which may conveniently be of the plastic material known under the registered trade-mark "Perspex," having one end 2 ground square and polished, while the other, or exit, end 3 tapers off in the form of a truncated cone. Butting against the end 2, and held in position by a metal sleeve 4, are three tributary portions 5 consisting of similar rods or bars of smaller cross-section. If desired, the end of the rod 1 may itself be split up into the desired number of tributary portions which would then, of course, be integral with the rod 1 instead of in butting contact therewith. The other end of each tributary portion is fitted with a lamp housing 6 of any suitable form within each of which is housed a lamp 7. In each housing, between the lamp and the end of the tributary portions is placed a colour filter 8 in such a manner that light rays from the lamp pass through the filter and are coloured before entering the portion 5. The three filters may, for example, be red, yellow and green respectively to give the three colours normally used for traffic controlling signals. The bulb of each lamp may be partially silvered and a reflector may be mounted behind the bulb in the lamp housing in order to increase the proportion of light rays emitted by the lamp which enter the light guide.

The light guide is so shaped and positioned that the exit end 3 is situated approximately at the focal point of a concave reflector 9 of a light signal. The control of the illumination of the lamps 7 may be carried out in any suitable manner in accordance with traffic conditions to cause red, yellow or green light rays to be transmitted through the guide. These rays emerge from the exit end 3 in substantially a cone of light which impinges upon the surface of the reflector 9 and is reflected as a substantially parallel beam, as indicated by the arrows 10.

It is at times desirable, in order that the light beam emerging from a signal shall be as concentrated as possible, that the source of light situated at the focal point of the reflector or lens system of the signal shall be as small and as concentrated as possible. For example, if a lamp with a large filament is placed at the focal point of the lens system of a light signal, the light beam from that signal will have what is known as a wide spread, which may in some circumstances be objectionable. If, however, a lamp with a small concentrated filament is employed the light beam will be substantially parallel with a narrow cut-off angle. Accordingly, if the optical system of the invention is to be used in a signal from which a relatively narrow parallel beam is required, the "source" situated at the focal point of the reflector or lens system may be made small by making the exit end of the light guide in the form of a truncated cone, as illustrated in Figure 1.

Unless steps are taken to prevent it, some of the light rays entering the light guide will, at some stage of their path through the rod, strike the inside surface thereof at an angle which is greater than the critical angle for the material of which the rod is made and, instead of being reflected back internally, will pass through and become lost. In order to overcome this loss of light some or all of the outer surface of the rod may be silvered in any suitable manner to ensure the internal reflection of all the light rays.

As the light rays emerge from the exit end of the guide they are refracted through an angle depending upon the refractive index of the material of which the light guide is made and, if the cross sectional area of the exit end is relatively small, the light rays may be considered to emerge in the form of a cone. It is found that using a light guide made of a rod of "Perspex" having a circular cross section of approximately ¼ inch diameter, that the solid angle subtended by this cone is approximately 90°. For many signals the divergence of the light emitted from the flat end of the rod may be sufficient to illuminate the whole aperture of the main optical system of the signal. If, however, a greater divergence is required, such as would be the case with a deep parabolic reflector, this may be achieved by providing the exit end of the light guide with suitable curved surfaces or facets, or with a diffusing surface, or by forming a "bead" on the end thereof, whereby the emerging light rays are diffused over a wider angle.

Figure 2 illustrates an alternative arrangement in which an aperture is provided at the centre of the reflector 9 through which projects the exit end of the light guide. The exit end is made bulbous, as indicated at 11, and the tip 12 of the bulbous portion is formed concave and is silvered to form a reflecting surface for light rays impinging upon it from within. The focus of the concave tip 12 is placed approximately at the focal point of the reflector 9 and light rays impinging upon it from within the rod 1 are reflected back through the walls of the bulbous portion to the surface of the reflector 9, whence they are reflected forward in a substantially parallel beam as illustrated by the arrows.

Figure 3 illustrates the invention as applied to a lens system. In this arrangement the exit end 3 of the guide is placed substantially at the focal point of the lens combination which comprises two lenses 13 and 14. It is believed that the operation of this arrangement will be evident without further detailed description.

In a modification of this form, the lenses 13, 14 may be replaced by a single lens constructed of the same material as and integral with, the rod 1. In such a construction the exit end 3 of the light guide may be flared out in the form of a cone, the base of which is formed in the desired lens contour and the apex of which is exit end of the rod 1.

If it is desired to use the optical system of the invention to provide an illuminated signal indication upon a panel or diagram the arrangement illustrated in Figure 4 may be used. As here illustrated the light guide is mounted behind a panel 15 with its exit end 3 flush with a flanged bush 16. The exit end 3 may be made to coincide with the appropriate portion of, for example, a light signal engraved or printed upon the front surface of the panel 15. In order to make the indication more readily visible over a wider angle, the surface of the exit end 3 may be slightly domed.

Having thus described our invention what we claim is:

1. An optical system comprising in combination, a transparent light guide; a plurality of lamp housings; a plurality of tributary rods of transparent material extending, respectively, between said lamp housings and one extremity of said light guide; and means individual to said tributary rods, respectively for imparting distinctive colour to light transferred from said lamp housings to said light guide by said tributary rods, respectively.

2. For a light signal, an optical system comprising in combination, a concave reflector having a focal point; a transparent light guide having one extremity situated approximately at said focal point; a plurality of lamp housings; tributary rods of transparent material extending, respectively, between each of said lamp housings and the other extremity of said light guide; and means individual to said tributary rods, respectively, for imparting distinctive colours to light rays emanating, respectively, from said lamp housings and passing from end to end of said tributary rods into said light guide.

3. For a light signal, an optical system comprising in combination, a concave reflector having an aperture therein; a transparent light guide having at one extremity thereof a silvered concave tip extending through said aperture, said tip being situated approximately at a focal point of said reflector; a plurality of lamp housings; tributary rods of transparent material extending, respectively, between each of said lamp housings and the other extremity of said light guide; and means individual to said tributary rods, respectively, for imparting distinctive colours to light rays emanating, respectively, from said lamp housings and passing from end to end of said tributary rods into said light guide.

4. For a light signal, an optical system comprising in combination, a lens system; a transparent light guide having one extremity situated at approximately a focal point of said lens system; a plurality of lamp housings; tributary rods of transparent material extending, respectively, between each of said lamp housings and the other extremity of said light guide; and means individual to paid tributary rods, respectively, for imparting distinctive colours to light rays emanating, respectively, from said lamp housings and passing from end to end of said tributary rods into said light guide.

5. For a light signal an optical system comprising in combination, a transparent light guide; a lens having a convex surface, one end of said light guide being flared out into the form of a cone having a base forming said convex surface of said lens, the apex of said cone being situated on the optical axis of said lens; a plurality of lamp housings; tributary rods of transparent material extending between each of said lamp housings and the other extremity of said light guide; and means individual to said tributary rods, respectively, for imparting distinctive colours to light rays emanating, respectively, from said lamp housings and passing from end to end of said tributary rods into said light guide.

6. In an illuminated diagram, a panel having an aperture therein; a transparent light guide having one extremity extending through said aperture and substantially flush with the front surface of said panel; a plurality of lamp housings; tributary rods of transparent material extending between each of said lamp housings and the other extremity of said light guide; and means individual to said tributary rods, respectively; for imparting distinctive colours to light rays emanating, respectively, from said lamp housings and passing from end to end of said tribuary rods into said light guide.

LESLIE HURST PETER.
EDWARD ALFRED SHEPPARD.
SYDNEY ARTHUR STEVENS.

REFERENCES CITED

The following references are of record in the file of this patent:

UNITED STATES PATENTS

| Number | Name | Date |
|---|---|---|
| 1,814,403 | Muller | July 14, 1931 |
| 2,227,861 | Petrone | Jan. 7, 1941 |
| 2,286,014 | Rowe | June 9, 1942 |
| 2,305,185 | Merkel | Dec. 15, 1942 |